(12) United States Patent
Huerth

(10) Patent No.: US 12,320,455 B1
(45) Date of Patent: Jun. 3, 2025

(54) HOSE WITH CONNECTOR AT INTERVALS

(71) Applicant: Sub-Zero Group, Inc., Madison, WI (US)

(72) Inventor: Andrew R. Huerth, Oregon, WI (US)

(73) Assignee: Sub-Zero Group, Inc, Madison, WI (US)

( * ) Notice: Subject to any disclaimer, the term of this patent is extended or adjusted under 35 U.S.C. 154(b) by 42 days.

(21) Appl. No.: 18/369,276

(22) Filed: Sep. 18, 2023

Related U.S. Application Data

(62) Division of application No. 17/307,193, filed on May 4, 2021, now abandoned.

(60) Provisional application No. 63/054,875, filed on Jul. 22, 2020.

(51) Int. Cl.
| | | |
|---|---|---|
| *B23P 11/00* | (2006.01) |
| *F16L 5/10* | (2006.01) |
| *F16L 25/00* | (2006.01) |
| *F16L 33/18* | (2006.01) |
| *F16L 33/28* | (2006.01) |

(52) U.S. Cl.
CPC .................. *F16L 33/28* (2013.01); *F16L 5/10* (2013.01); *F16L 25/0036* (2013.01); *F16L 33/18* (2013.01)

(58) Field of Classification Search
CPC ....... F16L 33/28; F16L 25/0036; F16L 33/18; F16L 25/009; F16L 31/00; F16L 25/14; F16L 11/121; F16L 25/0063; F16L 11/14; F16L 11/15; F16L 37/084; F16L 25/0045; F16L 39/02; F16L 39/005; F16L 47/26; E04D 13/08
See application file for complete search history.

(56) References Cited

U.S. PATENT DOCUMENTS

| | | | | |
|---|---|---|---|---|
| 3,873,137 | A * | 3/1975 | Yamaguchi | F16L 47/26 4/DIG. 16 |
| 5,813,701 | A * | 9/1998 | Noble | F16L 25/0063 138/119 |

FOREIGN PATENT DOCUMENTS

DE            19707518 C1 *  6/1998  ............ F16L 11/111

OTHER PUBLICATIONS

English translation of DE-19707518-C1 (Year: 1998).*

* cited by examiner

*Primary Examiner* — Jun S Yoo
(74) *Attorney, Agent, or Firm* — Bell & Manning, LLC

(57) ABSTRACT

A method of installing a hose is provided. A length of the hose is determined to mount between a first liquid connector and a second liquid connector. An interval connector is identified that is a greater distance than the length from a fixed connector mounted to a first end of the hose. The fixed connector mounts to the first liquid connector, and a removable connector mounts to the second liquid connector. A tube of the hose is cut at a connection end of the identified interval connector. The tube is also cut at a connection end of the removable connector. The connection end of the identified interval connector is mounted to the connection end of the removable connector to form a shortened hose.

20 Claims, 16 Drawing Sheets

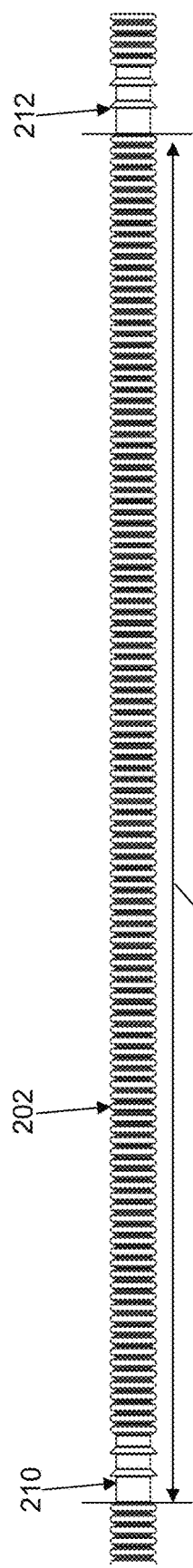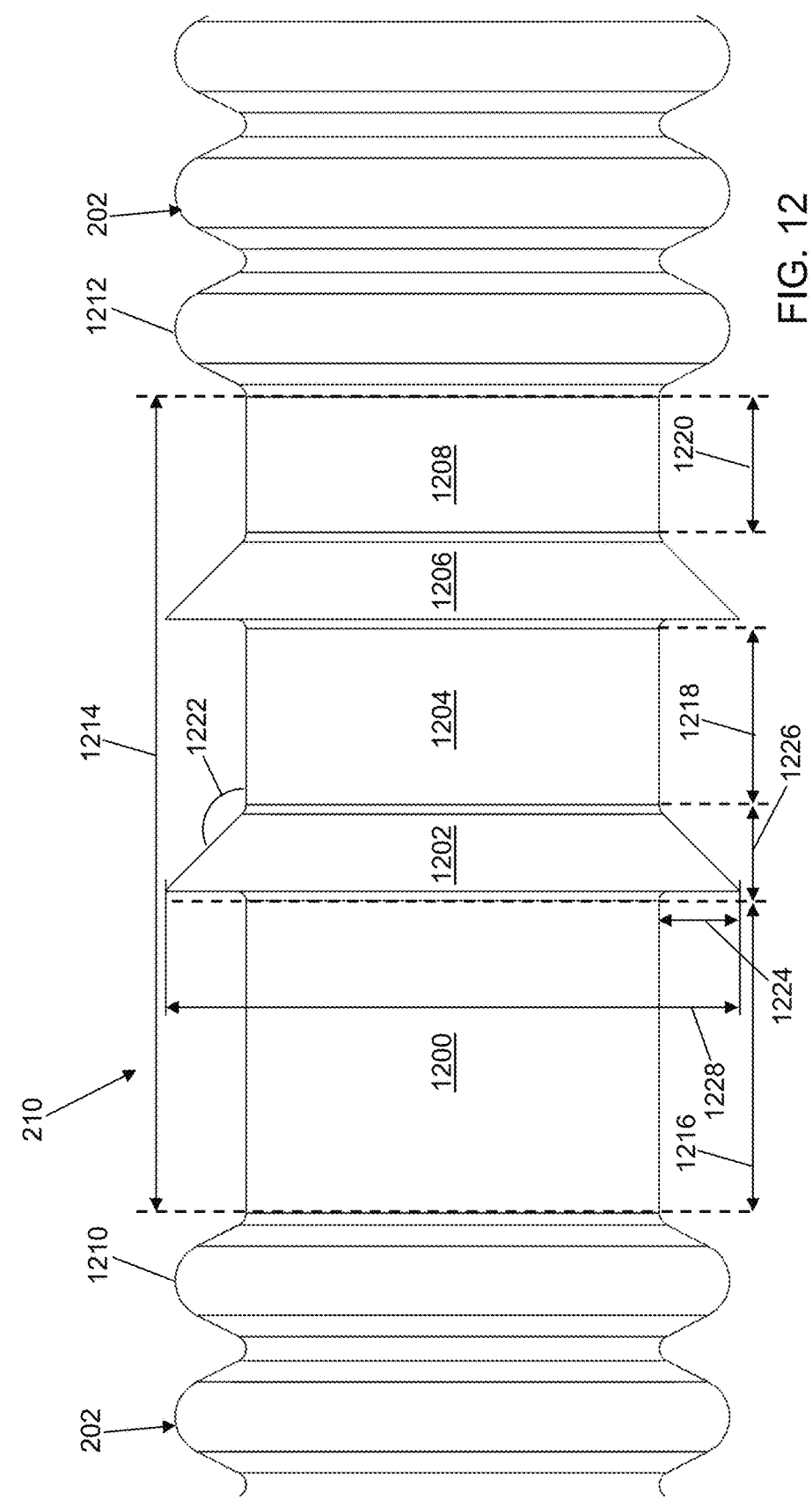

HOSE WITH CONNECTOR AT INTERVALS

CROSS-REFERENCE TO RELATED APPLICATIONS

The present application is a divisional of U.S. patent application Ser. No. 17/307,193 filed May 4, 2021, the entire contents of which are hereby incorporated by reference. U.S. patent application Ser. No. 17/307,193 claims the benefit of and priority based on 35 U.S.C. § 119 (e) to U.S. Provisional Patent Application No. 63/054,875 filed Jul. 22, 2020, the entire contents of which are also hereby incorporated by reference.

BACKGROUND

Corrugated hoses are routinely used in the appliance industry for drain lines for products like dishwashers, clothes washers, steam ovens, etc. For illustration, a hose construction may include a tube formed of a single or a dual wall corrugated portion that is extruded and blow molded through continuous chain segmented tooling. Polypropylene is an illustrative material for the tube due to its resistance to chemical attack. Corrugations are helpful to avoid abrasion and to give the tube hoop strength to prevent crushing without making the tube rigid. A liquid connector may be mounted to both ends of the tube.

Normally, the tube and connection ends cannot be adjusted for length such that the hose is used as manufactured. Lengths can exceed 10 feet for certain appliances to provide the appliance installer maximum flexibility when installing the appliance and providing the appropriate connectivity to receive a liquid from the appliance or to provide a liquid to the appliance. Extra length not needed to connect between the appliance and the liquid source or a drain is wrapped in a circular loop and positioned somewhere between where the hose connects to the appliance and to the liquid source or drain. An illustrative liquid source is a water faucet. An illustrative liquid drain is a drain tube.

For illustration, referring to FIG. 1, a first hose 102 is connected between a water faucet 104 and a first liquid connector 106 of a steam oven 100, and a second hose 108 is connected between a second liquid connector 112 of steam oven 100 and a drain tube 110. Water faucet 104 and drain tube 110 are illustrative liquid connectors to which first hose 102 or second hose 108 may be connected. An excess length of first hose 102 is wrapped in a first loop 114 under a sink. An excess length of second hose 108 is wrapped in a second loop 116 under the sink. Debris and liquid can accumulate in the extra loop(s) of tube. Additionally, the extra loop(s) of tube utilize space that could otherwise be used by a consumer.

SUMMARY

In an example embodiment, a hose is provided. The hose may include, but is not limited to, a fixed connector, a removable connector, and an interval connector. The fixed connector is configured to mount to a first liquid connector to transport a fluid. The fixed connector is mounted to a first end of the tube. The removable connector is configured to mount to a second liquid connector to transport the fluid. The removable connector is mounted to a second end of the tube opposite the fixed connector. The interval connector is mounted within the tube between the fixed connector and the removable connector. The interval connector is configured to mount to the removable connector to transport the fluid.

In another example embodiment, a method of installing the hose is provided. A length of a hose is determined to mount between a first liquid connector and a second liquid connector to transport a fluid. An interval connector is identified that is a greater distance than the determined length from a fixed connector mounted to a first end of a tube of the hose. The interval connector is configured to mount to a removable connector. The removable connector is mounted to a second end of the tube opposite the fixed connector. The fixed connector is configured to mount to the first liquid connector. The removable connector is configured to mount to the second liquid connector. The tube is cut at a connection end of the identified interval connector. The tube is cut at a connection end of the removable connector. The connection end of the identified interval connector is mounted to the connection end of the removable connector to form a shortened hose.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 11 depicts a front view of a portion of the hose of FIG. 2 in accordance with an illustrative embodiment.

FIG. 12 depicts a front view of an interval connector of the hose of FIG. 2 in accordance with an illustrative embodiment.

DETAILED DESCRIPTION

Figure 1:
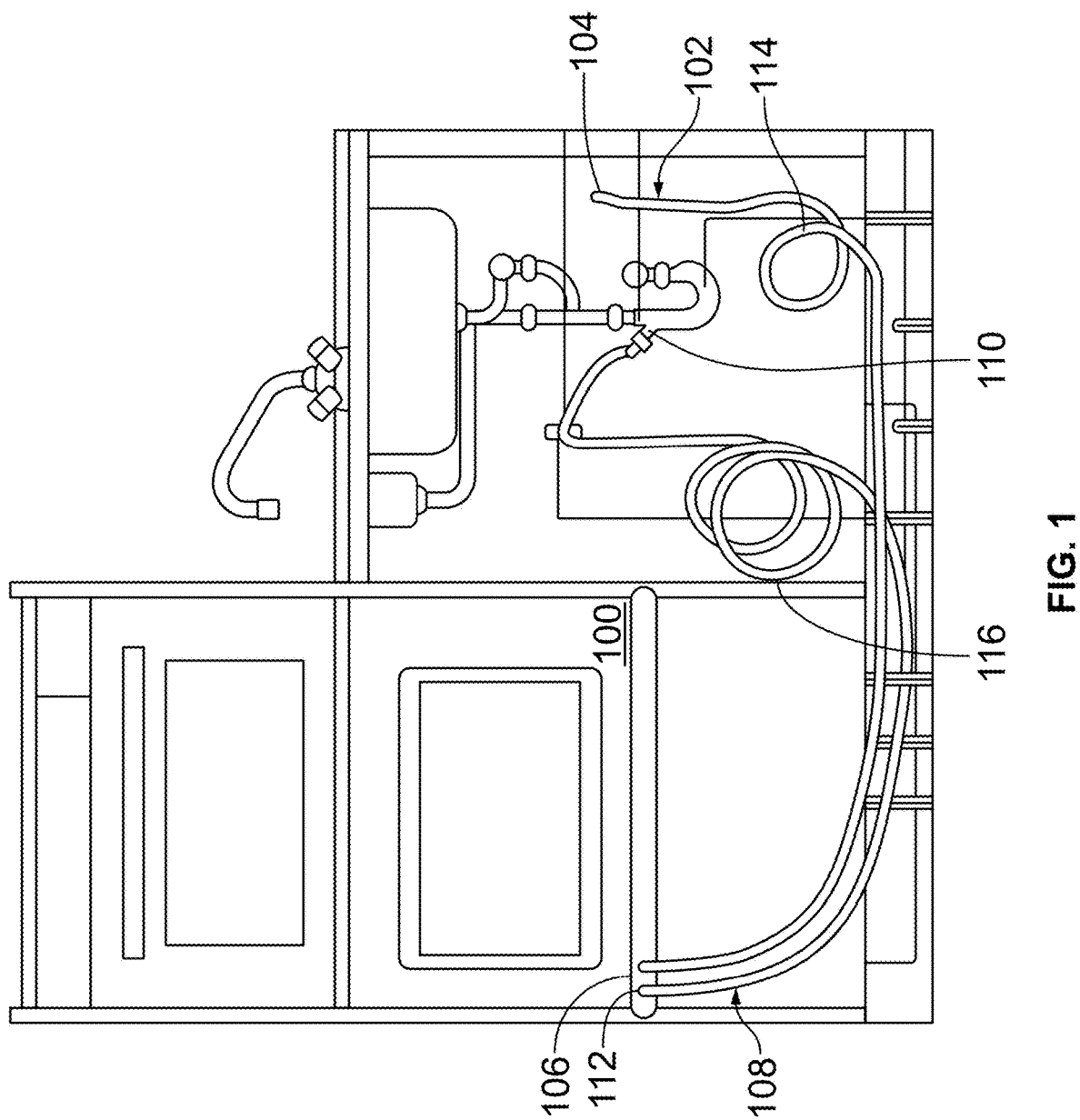
FIG. 1 depicts an appliance hose usage in accordance with an illustrative embodiment.
Figure 2:
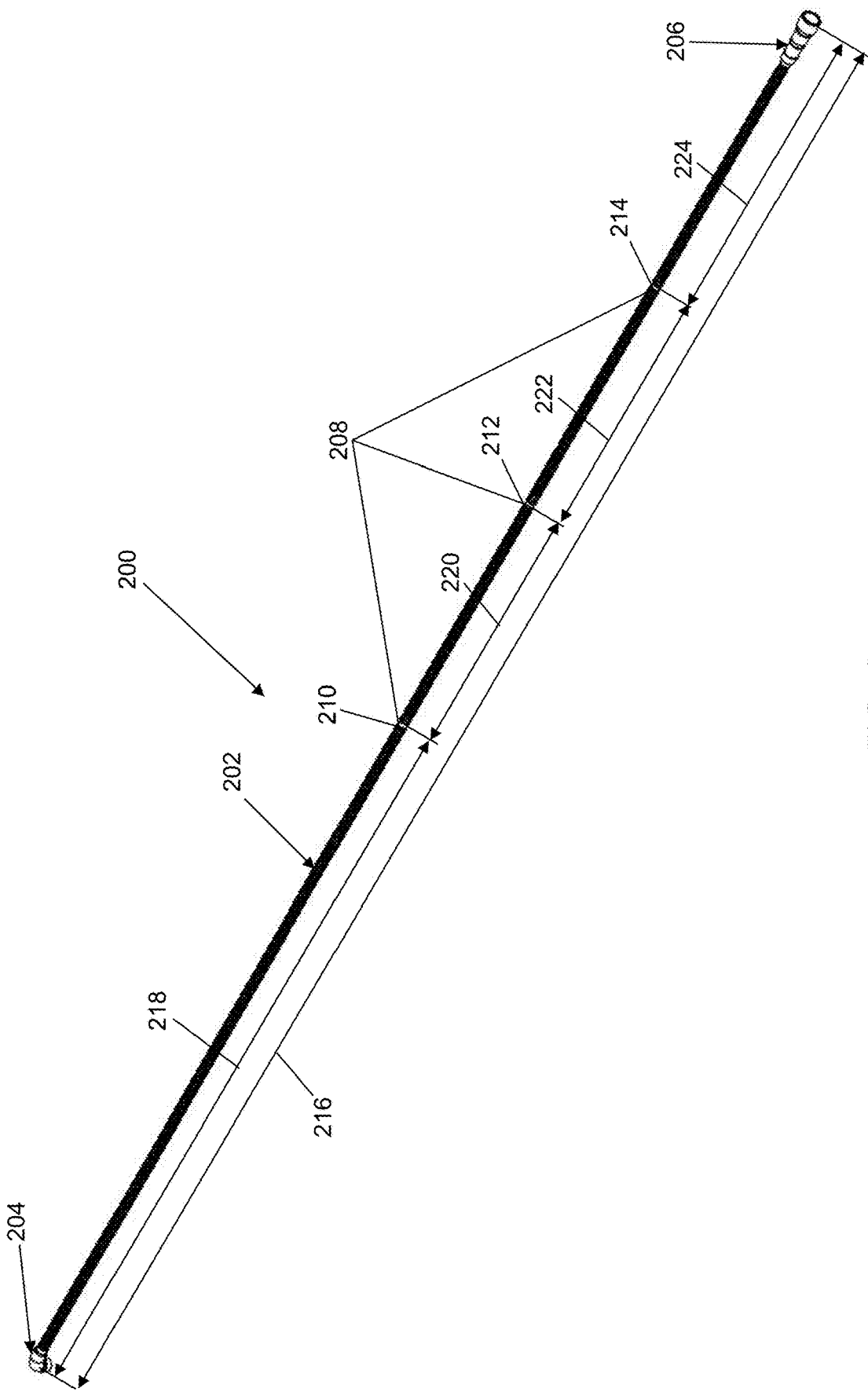
FIG. 2 depicts a top, front perspective view of a hose in accordance with an illustrative embodiment.

Referring to FIG. 2, a top, front perspective view of a hose 200 is shown in accordance with an illustrative embodiment. Hose 200 may include a tube 202, a first connector 204, a second connector 206, and a plurality of interval connectors 208. In an alternative embodiment, hose 200 may include a single interval connector of the plurality of interval connectors 208. Tube 202 may or may not be corrugated along its length and has a circular cross section though other cross section shapes may be used.

First connector 204 and second connector 206 are configured to connect to an appliance, to a liquid source, or to a drain so that a liquid can be transported through hose 200. For example, first connector 204 and second connector 206 may have various configurations to make a sealing connection with the appliance such as steam oven 100, with the liquid source, or with the drain. Though liquid is used herein, it should be understood that liquid is intended to include any non-solid material that has a sufficient viscosity to flow and includes a gas. A type of the appliance may be a refrigerator, a dishwasher, a steam oven, a water dispenser, a clothes washer, a steam dryer, a coffee maker, etc.

Hose 200 can be shortened by removing one of first connector 204 or second connector 206 and cutting adjacent an end of a selected interval connector of the plurality of interval connectors 208. The selected interval connector is then mounted to the removed first connector 204 or second connector 206 to make a liquid tight connection, and a remaining portion of tube 202 can be discarded. The interval connector is selected to provide the appropriate length for hose 200 based on the installation environment and any desired sag in hose 200. As a result, one of first connector 204 or second connector 206 may be referred to as a fixed connector while the other of first connector 204 or second connector 206 may be referred to as a removable connector.

In the illustrative embodiment of FIG. 2, hose 200 includes three interval connectors, a first interval connector 210, a second interval connector 212, and a third interval connector 214 in order of increasing distance from first connector 204 or in order of decreasing distance from second connector 206. Hose 200 may include a greater or a fewer number of interval connectors that may be periodically distributed along a length 216 of hose 200 or at varying distances along length 216 of hose 200.

The plurality of interval connectors 208 are formed in tube 202, for example, using a molding process or a welding process. For example, tube 202 including the plurality of interval connectors 208 may be molded using a thermoplastic polymer material such as polypropylene or a thermoplastic elastomer (TPE) material. For example, a TPE material has flexible properties that mimic rubber and can be spin welded or over molded to polypropylene. First connector 204 and second connector 206 may be molded with tube 202 using the same or a different material. For example, first connector 204 and second connector 206 may be over molded or spun welded to opposite ends of tube 202 to provide a connection fitting, an elbow, etc. based on the application area. Illustrative materials for first connector 204 and second connector 206 s include Santoprene™, a flexible thermoplastic elastomer marketed by Exxon Mobil Corporation of Spring Texas, USA.

The plurality of interval connectors 208 are distributed along length 216 of hose 200 between first connector 204 and second connector 206. For example, first interval connector 210 is located a first distance 218 from first connector 204, second interval connector 212 is located a first separation distance 220 from first interval connector 210, and third interval connector 214 is located a second separation distance 222 from second interval connector 212. Third interval connector 214 is located a second distance 224 from second connector 206. First separation distance 220 may be approximately equal to second separation distance 222 or the distances may be different. First distance 218 may be the same or different from first separation distance 220 and/or second separation distance 222.

A number of the plurality of interval connectors 208 may be selected by a hose designer based on a range of possible usage environments and length 216 of hose 200. For example, length 216 may be selected based on a maximum expected length needed for installation of an associated appliance. First distance 218 may be selected based on a minimum expected length needed for installation of the associated appliance. First separation distance 220 and/or second separation distance 222 may be selected based on a difference between length 216 and first distance 218 to provide a number of length option. in an illustrative embodiment, length 216 may be ~10 feet ('), first distance 218 may be ~5', first separation distance 220 and second separation distance 222 may be ~1.5', and second distance 224 may be ~22 inches (").

Figure 3:
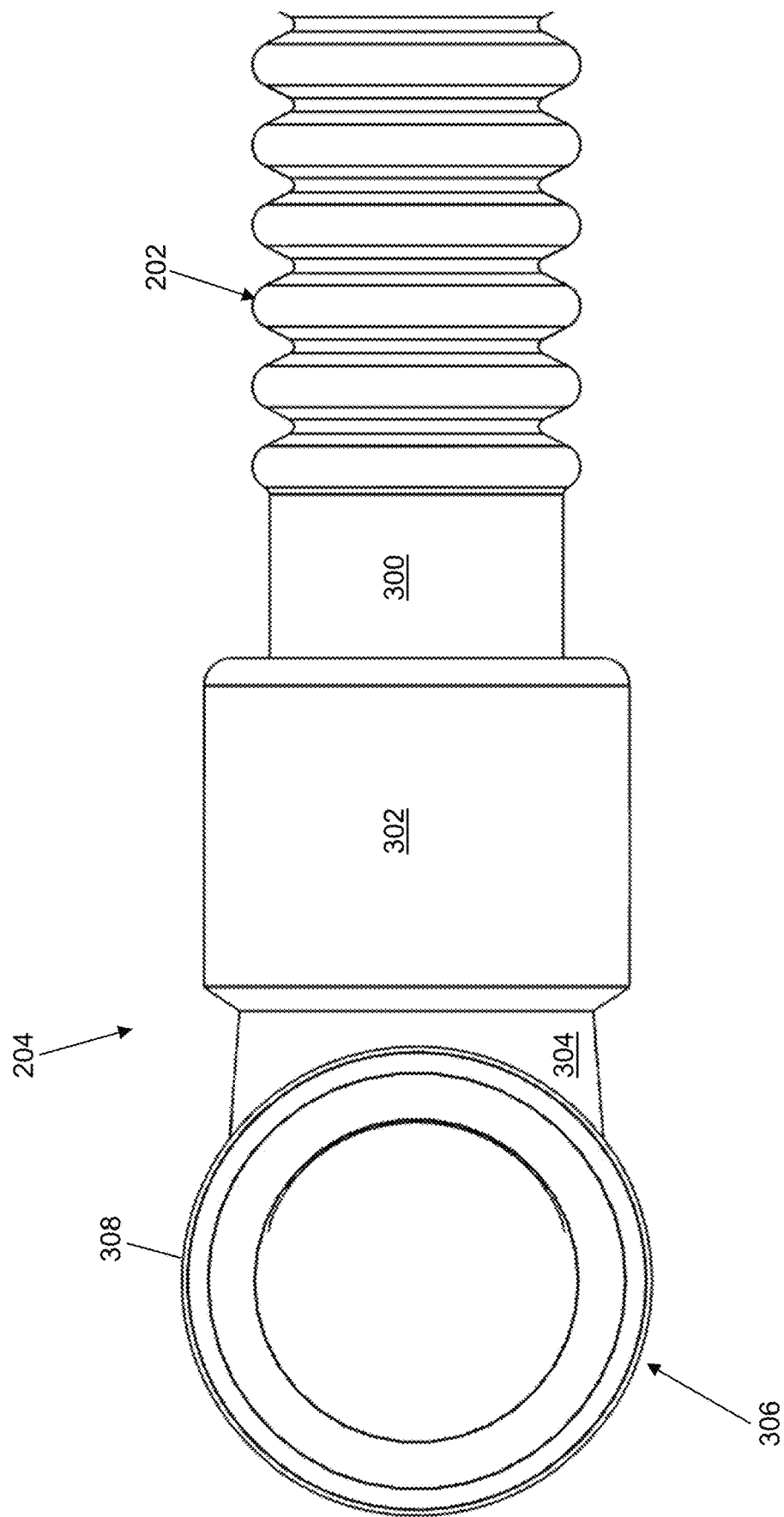
FIG. 3 depicts a bottom view of a first connector end of the hose of FIG. 2 in accordance with an illustrative embodiment.
Figure 4:
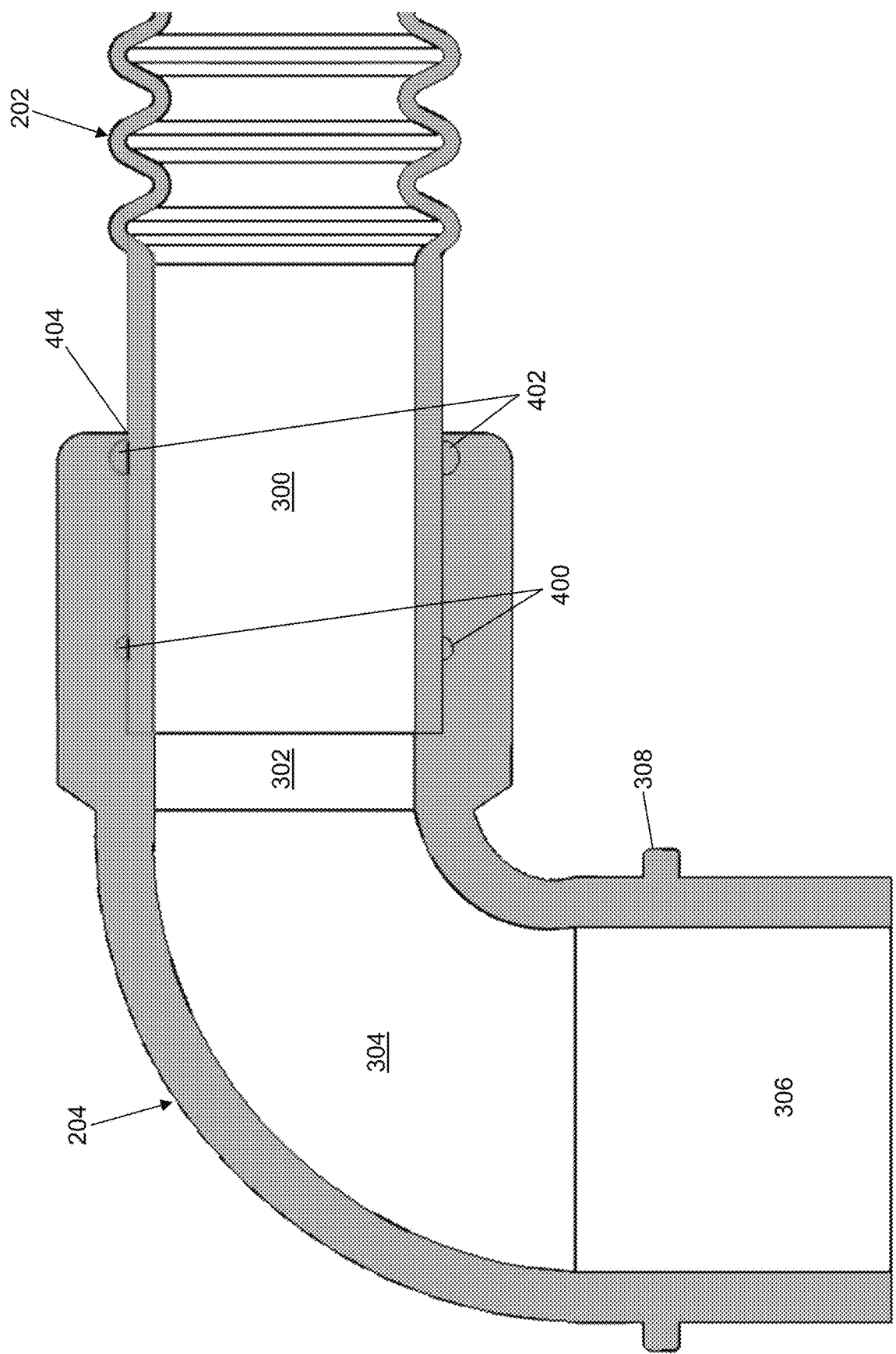
FIG. 4 depicts a front cross-sectional view of the first connector end of the hose of FIG. 2 in accordance with an illustrative embodiment.
Figure 5:
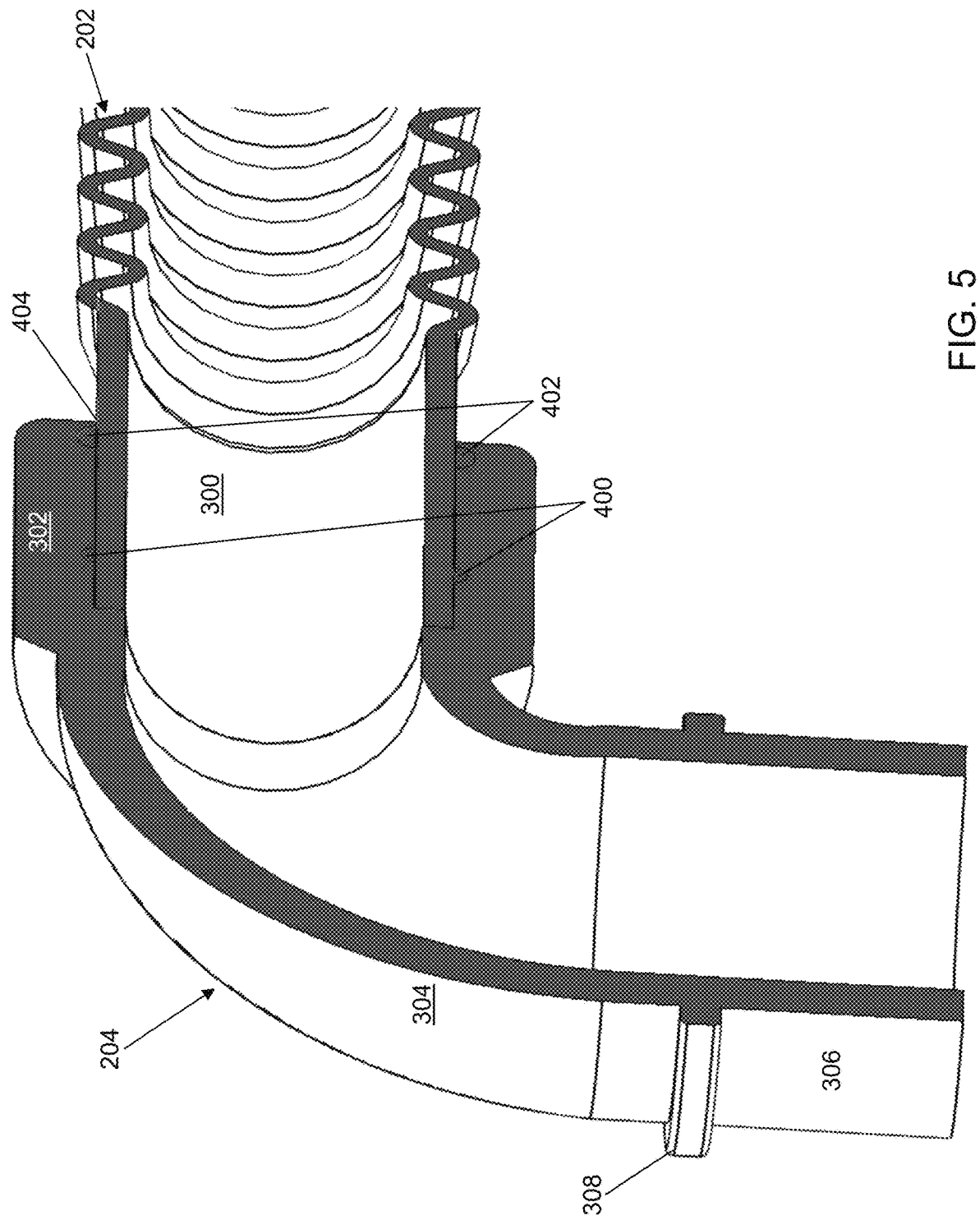
FIG. 5 depicts a front, left cross-sectional view of the first connector end of the hose of FIG. 2 in accordance with an illustrative embodiment.

Referring to FIG. 3, a bottom view of first connector 204 of hose 200 is shown in accordance with an illustrative embodiment. Referring to FIG. 4, a front cross-sectional view of first connector 204 is shown in accordance with an illustrative embodiment. Referring to FIG. 5, a front, left cross-sectional view of first connector 204 is shown in accordance with an illustrative embodiment. First connector 204 may include a first tube body connector 300, a first tube connector 302, a curved connector segment 304, and a first connector segment 306. Curved connector segment 304 mounts between first tube connector 302 and first connector segment 306 to provide an angular transition. In the illustrative embodiment, curved connector segment 304 is an elbow that provides 90 degrees (°) of transition between first tube connector 302 and first connector segment 306.

First tube body connector 300, first tube connector 302, curved connector segment 304, and first connector segment 306 may be formed as a single piece by molding or as a plurality of distinct pieces mounted to each other using a friction fit, adhesive, tape, welding, etc. For example, first tube body connector 300 may be molded as part of tube 202; whereas, first tube connector 302, curved connector segment 304, and first connector segment 306 may be molded together to form a single piece.

A first flange 308 may be formed to extend peripherally outward from an exterior surface of first connector segment 306. First flange 308 may be formed of the same or a different material than first connector segment 306. Sealing takes place on an inside surface and/or inner diameter. First flange 308 may act as a locator for locating a clamp in a proper position.

Similarly, a second flange 400 and a third flange 402 may be formed to extend peripherally outward from an exterior surface of first tube body connector 300. Second flange 400 and a third flange 402 may be formed of the same or a different material than first tube body connector 300. First tube body connector 300 may be inserted into an aperture 404 formed in an end of first tube connector 302 to mount tube 202 to first connector 204 using a friction fit reinforced by second flange 400 and third flange 402.

In the illustrative embodiments, first connector 204 is a fixed connector. In alternative embodiments, first connector 204 may have other shapes and sizes selected to mount to either the appliance, the liquid source, or the drain.

Figure 6:
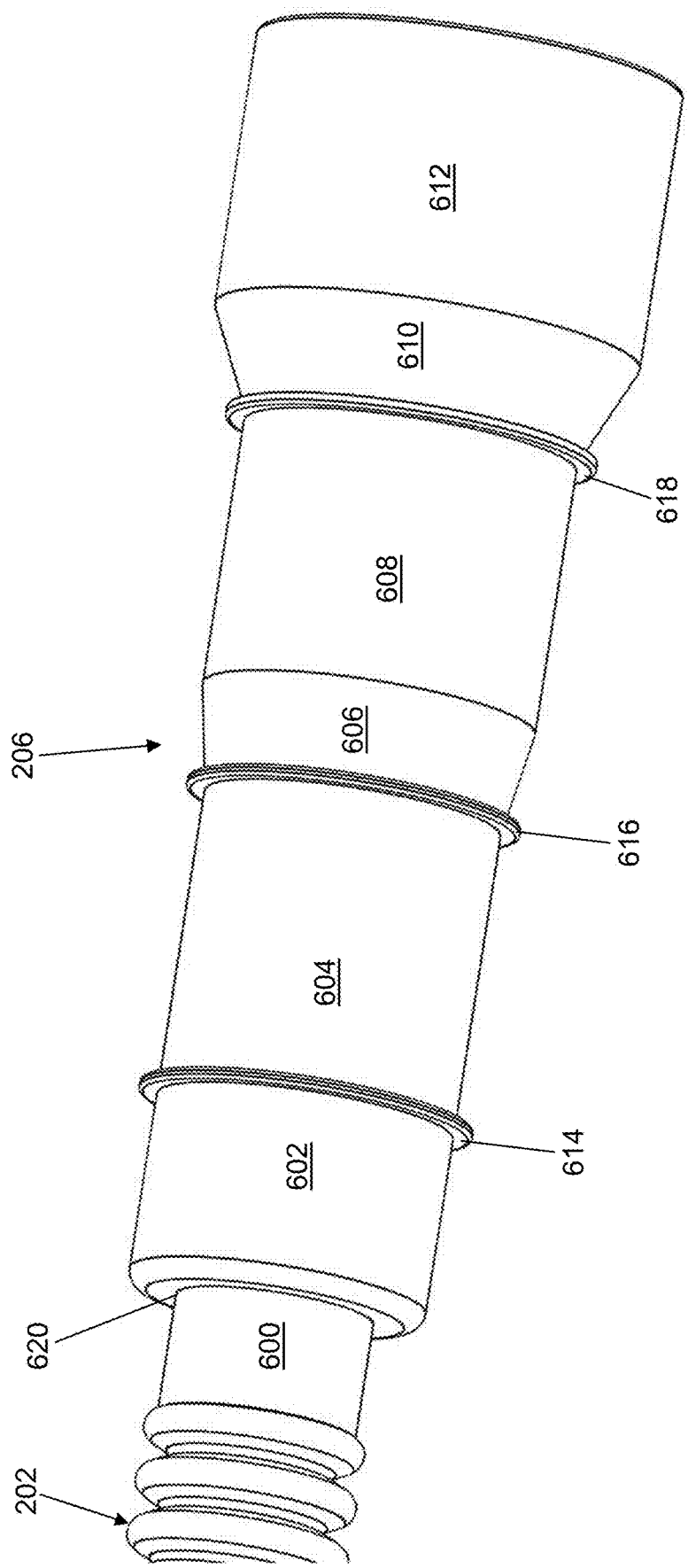
FIG. 6 depicts a front view of a second connector end of the hose of FIG. 2 in accordance with an illustrative embodiment.
Figure 7:
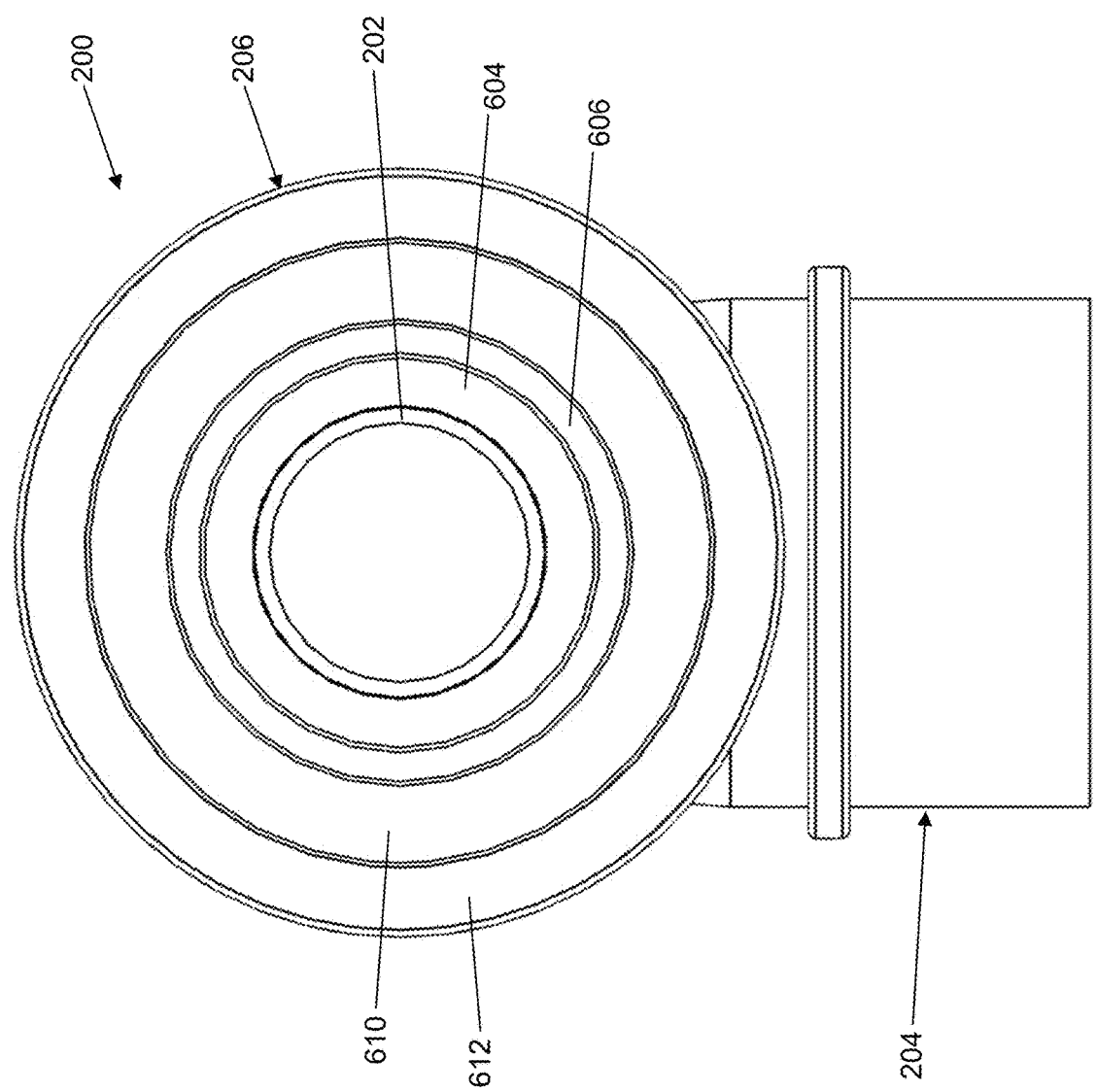
FIG. 7 depicts a right view of the hose of FIG. 2 in accordance with an illustrative embodiment.
Figure 8:
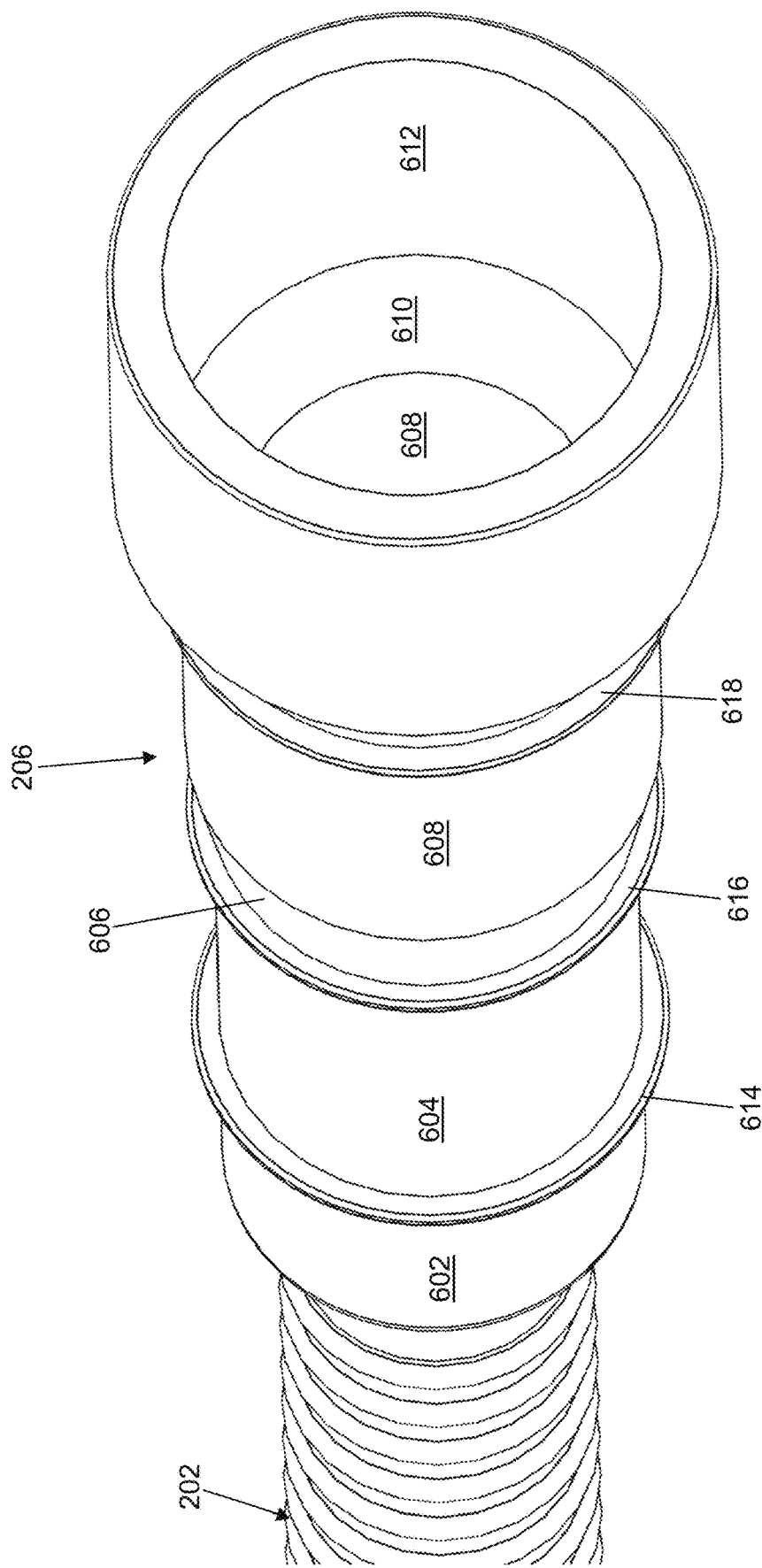
FIG. 8 depicts a right, front perspective view of the second connector end of the hose of FIG. 2 in accordance with an illustrative embodiment.
Figure 9:
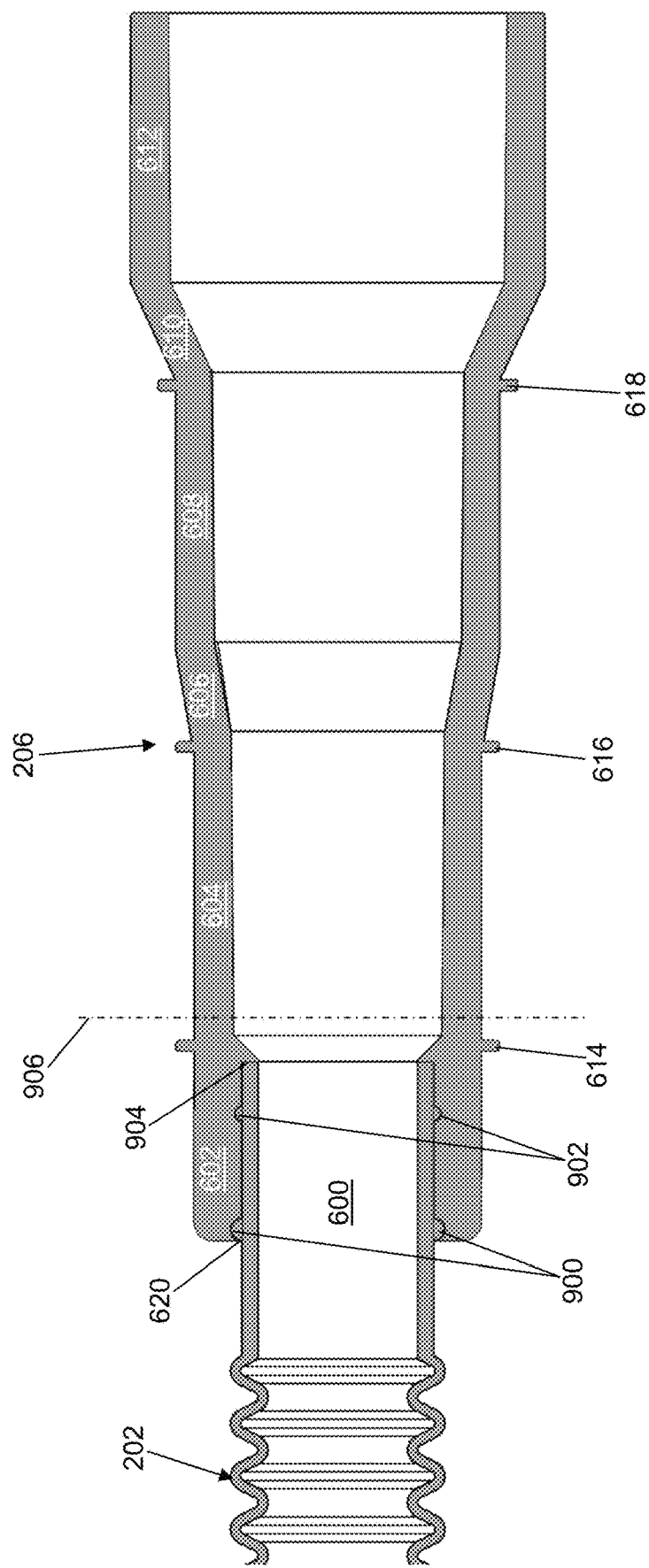
FIG. 9 depicts a front cross-sectional view of the second connector end of the hose of FIG. 2 in accordance with an illustrative embodiment.
Figure 10:
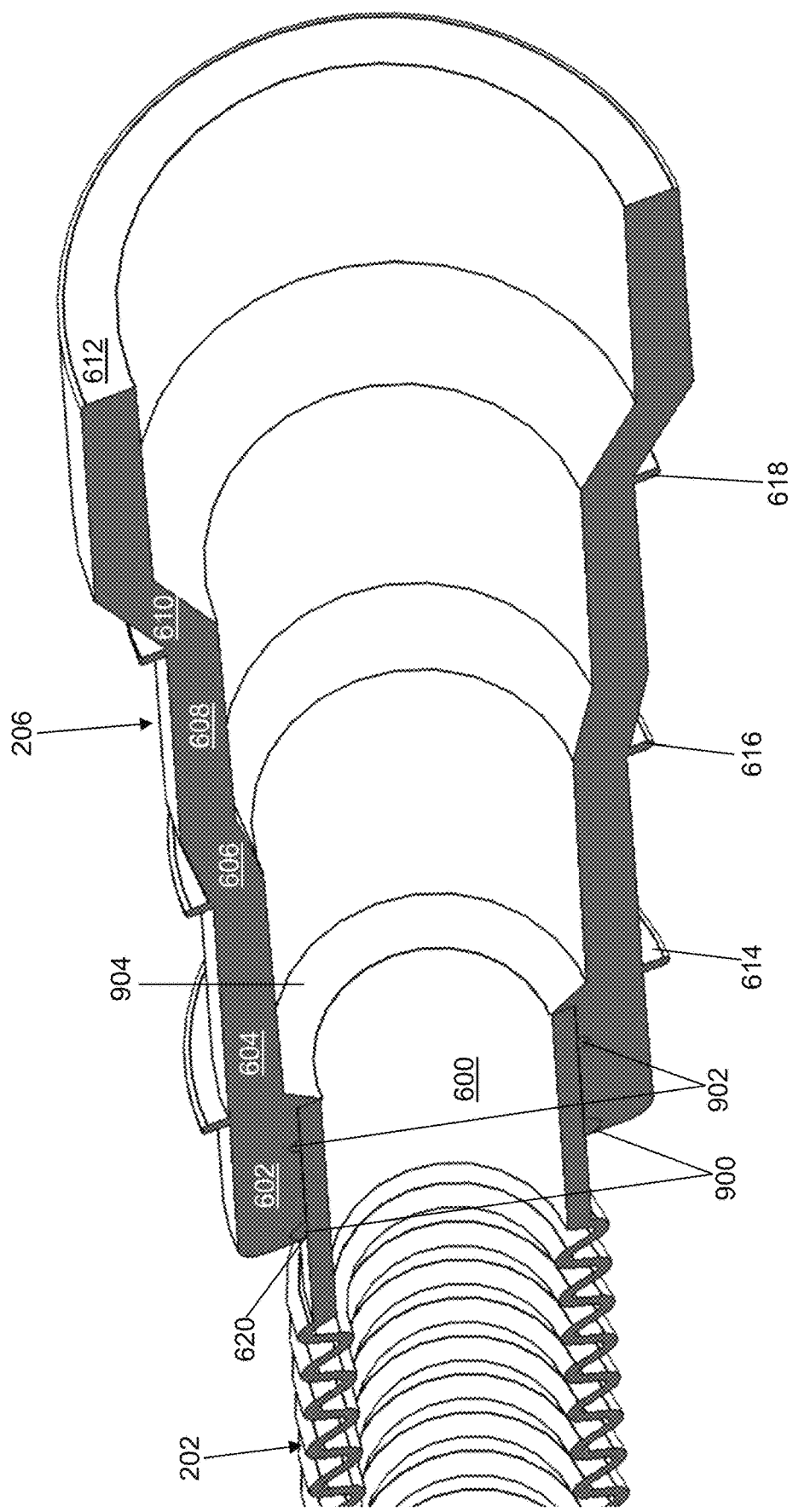
FIG. 10 depicts a front, right cross-sectional view of the second connector end of the hose of FIG. 2 in accordance with an illustrative embodiment.

Referring to FIG. 6, a front view of second connector 206 is shown in accordance with an illustrative embodiment. Referring to FIG. 7, a right view of hose 200 is shown in accordance with an illustrative embodiment. Referring to FIG. 8, a right, front perspective view of second connector 206 is shown in accordance with an illustrative embodiment. Referring to FIG. 9, a front cross-sectional view of second connector 206 is shown in accordance with an illustrative embodiment. Referring to FIG. 10, a front, right cross-sectional view of second connector 206 is shown in accordance with an illustrative embodiment. In the illustrative embodiment, second connector 206 include a series of segments separated by flanges. Second connector 206 may have different shapes and sizes and numbers of segments based on the connection requirements for second connector 206 to connect to the appliance, liquid source, or drain. In the illustrative embodiments, second connector 206 is a removable connector.

In the illustrative embodiment, second connector 206 includes a second tube body connector 600, a second tube connector 602, a third tube connector 604, a fourth tube connector 606, a fifth tube connector 608, a sixth tube connector 610, a seventh tube connector 612, a fourth flange 614, a fifth flange 616, and a sixth flange 618. Second tube body connector 600, second tube connector 602, third tube connector 604, fourth tube connector 606, fifth tube connector 608, sixth tube connector 610, and seventh tube connector 612 may be formed as a single piece by molding or as a plurality of distinct pieces mounted to each other using a friction fit, adhesive, welding, etc. For example, second tube body connector 600 may be molded as part of tube 202; whereas, second tube connector 602, third tube connector 604, fourth tube connector 606, fifth tube connector 608, sixth tube connector 610, and seventh tube connector 612 may be molded together to form a single piece.

Fourth flange 614, fifth flange 616, and sixth flange 618 may be formed as part of a molding process with second tube connector 602, third tube connector 604, fourth tube connector 606, fifth tube connector 608, sixth tube connector 610, and seventh tube connector 612. As another alternative, fourth flange 614, fifth flange 616, and sixth flange 618 may be mounted later, for example, using adhesive, tape, welding, etc.

Fourth flange 614 may be formed to extend peripherally outward from an exterior surface between second tube connector 602 and third tube connector 604. Fourth flange 614 forms an integral O-ring to assist in providing a sealing connection with the appliance, liquid source, or drain. Fourth flange 614 may be formed of the same or a different material than second tube connector 602 and third tube connector 604. For example, fourth flange 614 may be formed of a more elastic material such as a rubber material.

Similarly, fifth flange 616 may be formed to extend peripherally outward from an exterior surface between third tube connector 604 and fourth tube connector 606. Fifth flange 616 forms an integral O-ring to assist in providing a sealing connection with the appliance, liquid source, or drain. Fifth flange 616 may be formed of the same or a different material than third tube connector 604 and fourth tube connector 606. For example, fifth flange 616 may be formed of a more elastic material such as a rubber material.

Similarly, sixth flange 618 may be formed to extend peripherally outward from an exterior surface between fifth tube connector 608 and sixth tube connector 610. Sixth flange 618 forms an integral O-ring to assist in providing a sealing connection with the appliance, liquid source, or drain. Sixth flange 616 may be formed of the same or a different material than fifth tube connector 608 and sixth tube connector 610. For example, sixth flange 618 may be formed of a more elastic material such as a rubber material.

Third tube connector 604 mounts to an end of second tube connector 602 opposite tube 202. Second tube connector 602 and third tube connector 604 have a common exterior radius from a center of second connector 206. Fourth tube connector 606 flares outward from where fourth tube connector 606 mounts to third tube connector 604 opposite second tube connector 602. Fifth tube connector 608 mounts to an end of fourth tube connector 606 opposite third tube connector 604. Fifth tube connector 608 is cylindrical with a constant exterior radius from the center of second connector 206. Sixth tube connector 610 flares outward from where sixth tube connector 610 mounts to fifth tube connector 608 opposite fourth tube connector 606. Seventh tube connector 612 mounts to an end of sixth tube connector 610 opposite fifth tube connector 608. Seventh tube connector 612 is cylindrical with a constant exterior radius from the center of second connector 206.

A seventh flange 900 and an eighth flange 902 may be formed to extend peripherally outward from an exterior surface of second tube body connector 600. Seventh flange 900 and eighth flange 902 form integral O-rings to assist in providing a sealing connection between second tube body connector 600 and second tube connector 602. Seventh flange 900 and eighth flange 902 may be formed of the same or a different material than second tube body connector 600. For example, seventh flange 900 and eighth flange 902 may be formed of a more elastic material such as a rubber material. Second tube body connector 600 may be inserted into an aperture 620 formed in an end of second tube body connector 600 to mount tube 202 to second connector 206 using a friction fit reinforced by seventh flange 900 and eighth flange 902.

A first flared flange 904 may be formed to extend inward peripherally from an interior surface between second tube connector 602 and third tube connector 604. first flared flange 904 may be sized and shaped to form an abutment and a sealing surface for an end of second tube body connector 600 when second tube body connector 600 is inserted into second tube connector 602.

The inner diameters of second connector 206 may be chosen to mate with various standard pipe sizes and can vary depending on market, location, or installation need. A wall thickness (or outer diameter) of second connector 206 may be determined by a clamp size and a need for a uniform wall thickness.

Second connector 206 can be cut along a connector cut line 906 to remove second tube body connector 600 from second connector 206 when hose 200 is to be shortened. In alternative embodiments, second connector 206 can be cut at alternative locations to remove second tube body connector 600 from second connector 206 and provide a mating connection for one of the plurality of interval connectors 208.

Figure 13:
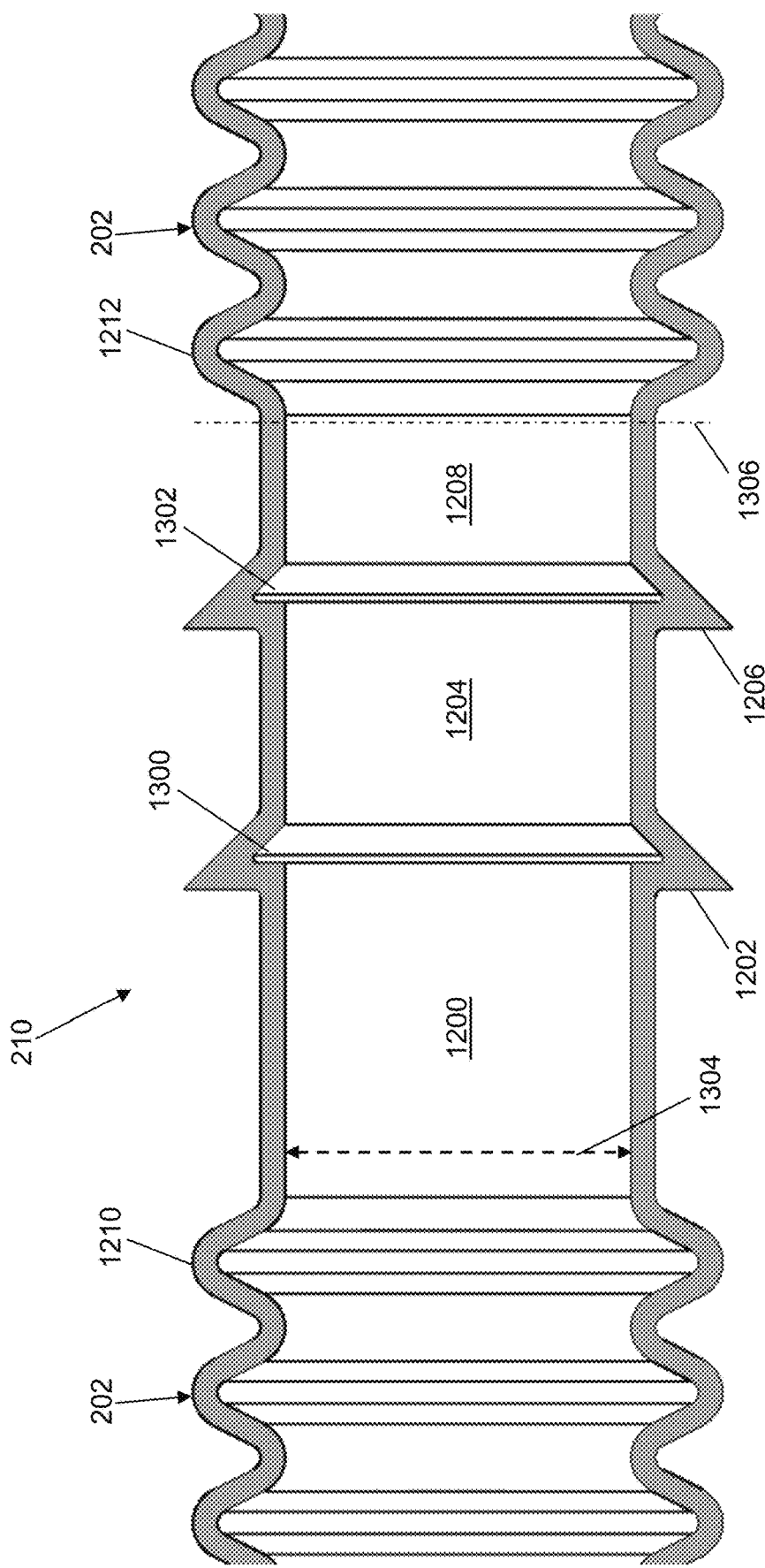
FIG. 13 depicts a front cross-sectional view of the interval connector of the hose of FIG. 2 in accordance with an illustrative embodiment.
Figure 14:
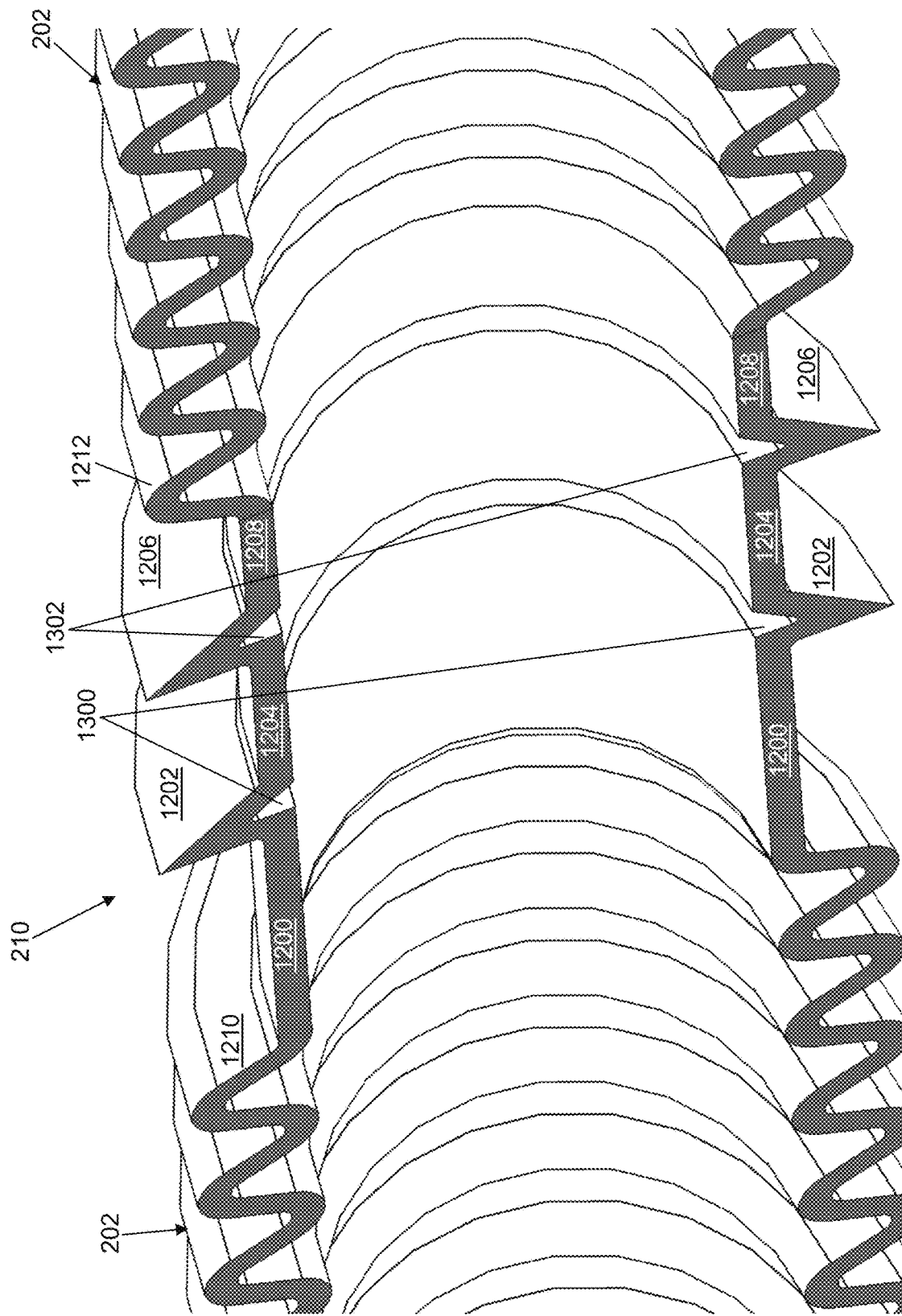
FIG. 14 depicts a front, right cross-sectional view of the interval connector of the hose of FIG. 2 in accordance with an illustrative embodiment.

Referring to FIG. 11, a zoomed front view of a portion of hose 200 adjacent and between first interval connector 210 and second interval connector 212 is shown in accordance with an illustrative embodiment. Referring to FIG. 12, a front view of first interval connector 210 is shown in accordance with an illustrative embodiment. Referring to FIG. 13, a front cross-sectional view of first interval connector 210 in accordance with an illustrative embodiment. Referring to FIG. 14, a front, right cross-sectional view of first interval connector 210 in accordance with an illustrative embodiment. Second interval connector 212, and third interval connector 214 may have a similar size and shape. A portion of tube 202 is mounted between each interval connector of the plurality of interval connectors 208. For example, first interval connector 210 is connected between a first tube loop 1210 of tube 202 and a second tube loop 1212 of tube 202 though in alternative embodiments, tube 202 may not be corrugated.

In the illustrative embodiment, first interval connector 210 include a series of segments separated by flange gaskets. First interval connector 210 (and any remaining interval connectors) may have a different shape and size and numbers of segments based on the connection requirements for first interval connector 210 to the removable connector such as second connector 206 in the illustrative embodiment.

In the illustrative embodiment, first interval connector 210 includes a first band 1200, a first flange gasket 1202, a second band 1204, a second flange gasket 1206, and a third band 1208. First band 1200, first flange gasket 1202, second band 1204, second flange gasket 1206, and third band 1208 may be formed as a single piece by molding or as a plurality of distinct pieces mounted to each other using a friction fit, adhesive, welding, etc. In an illustrative embodiment, first band 1200, first flange gasket 1202, second band 1204, second flange gasket 1206, and third band 1208 may be molded as part of tube 202. As another alternative, first flange gasket 1202 and second flange gasket 1206 may be mounted later, for example, using adhesive, tape, welding, etc.

In the illustrative embodiment, first band 1200, second band 1204, and third band 1208 have a common exterior radius from a center of first interval connector 210. First band 1200, second band 1204, and third band 1208 similarly may have a common interior diameter 1304. First flange gasket 1202 is mounted between first band 1200, second band 1204, and second flange gasket 1206 is mounted between second band 1204 and third band 1208.

First interval connector 210 may have a connector length 1214 between ends of tube 202. First band 1200 may have a first band length 1216. Second band 1204 may have a second band length 1218. Third band 1206 may have a third band length 1220. In an illustrative embodiment, interior diameter 1304 is ~0.39, connector length 1214 is 0.088", first band length 1216 is 0.3"4, second band length 1218 is ~0.19", and third band length 1220 is ~0.15".

First flange gasket 1202 and second flange gasket 1206 may have a similar size and shape. First flange gasket 1202 flares peripherally outward at an angle 1222 from an exterior surface of second band 1204 where first flange gasket 1202 mounts between first band 1200 and second band 1204. Second flange gasket 1206 flares peripherally outward at angle 1222 from an exterior surface of third band 1208 where second flange gasket 1206 mounts between second band 1204 and third band 1208. First flange gasket 1202 and second flange gasket 1206 extend perpendicularly a lip distance 1224 from the exterior surface of second band 1204 and third band 1208, respectively. First flange gasket 1202 and second flange gasket 1206 extend a flange length 1226 between first band 1200 and second band 1204 and between second band 1204 and third band 1208, respectively. In an illustrative embodiment, angle 1222 is 135 degrees, lip distance 1224 is 0.88, and flange length 1226 is 0.88.

A first valley 1300 may extend peripherally inward from an interior surface between first band 1200 and second band 1204. A second valley 1302 may extend peripherally inward from an interior surface between second band 1204 and third band 1208. First valley 1300 and second valley 1302 may result when blowing a molten material into an external barb shape defined by first flange gasket 1202 and second flange gasket 1206.

First interval connector 210 can be cut along a cut line 1306 to remove first interval connector 210 from between first tube loop 1210 of tube 202 and second tube loop 1212 of tube 202 when hose 200 is to be shortened. A barb diameter 1228 may be selected based on a diameter of the removeable connector at a desired mating location to provide a seal as the removeable connector stretches over first interval connector 210. In alternative embodiments, first interval connector 210 can be cut at alternative locations to remove first interval connector 210 from second tube loop 1212 of tube 202 and provide a mating connection to the removable connector.

Figure 15:
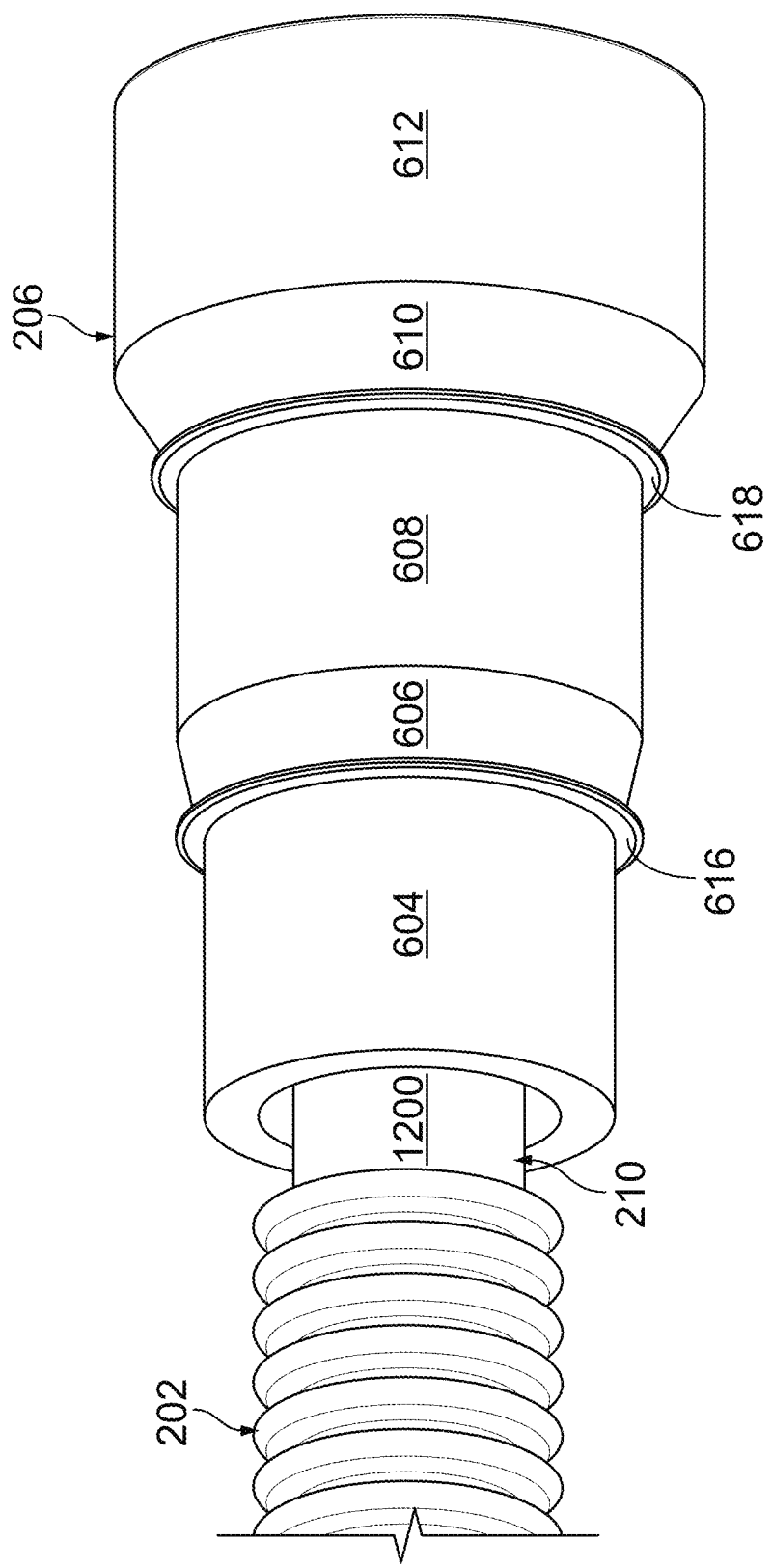
FIG. 15 depicts a front perspective view of the second connector end of the hose of FIG. 2 after shortening in accordance with an illustrative embodiment.
Figure 16:
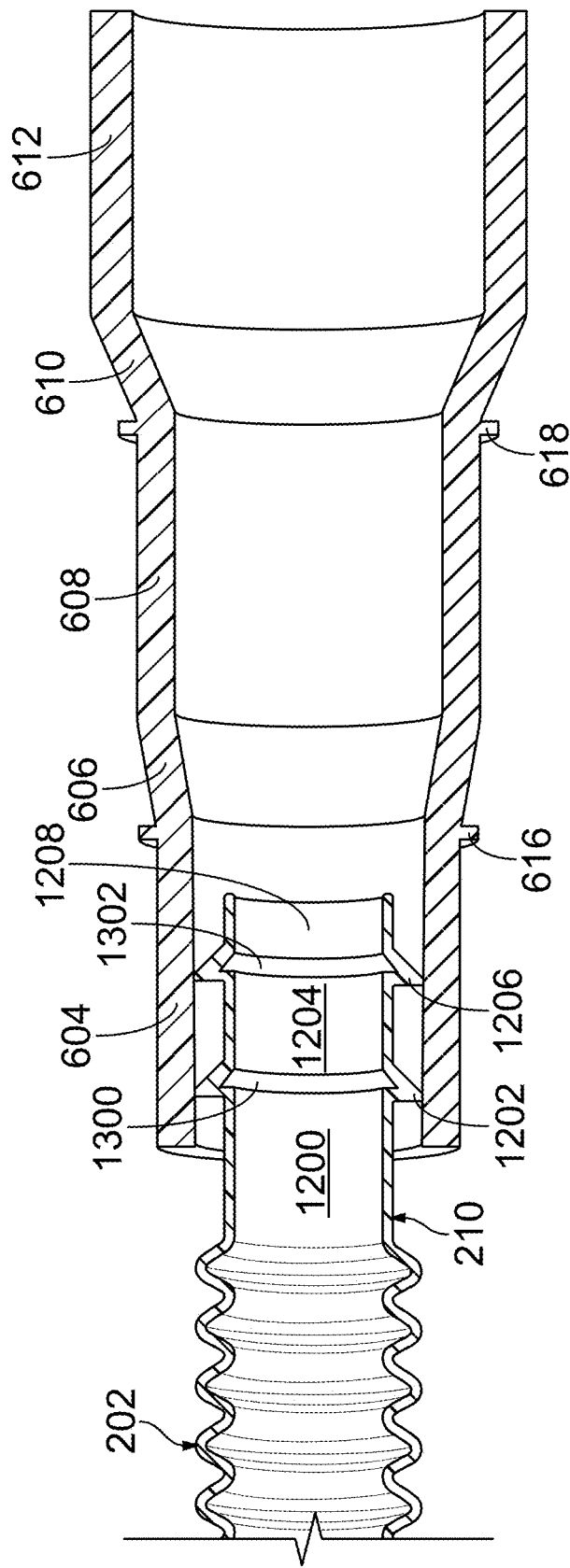
FIG. 16 depicts a front cross-sectional view of the second connector end of the hose of FIG. 2 after shortening in accordance with an illustrative embodiment.

Referring to FIG. 15, a front perspective view of second connector 206 is shown after shortening in accordance with an illustrative embodiment. Referring to FIG. 16, a front cross-sectional view of second connector 206 is shown after shortening in accordance with an illustrative embodiment. In the illustrative embodiment, tube 202 was cut on an end of first interval connector 210 closest to the removable connector, which is second connector 206. In alternative embodiments, tube 202 could have been similarly cut on an end of second interval connector 212 or of third interval connector 214 based on the desired length of hose 200.

A remaining portion of third band 1208 can be inserted into third tube connector 604 to mount first interval connector 210 to second connector 206 using a friction fit reinforced by first flange gasket 1202 and second flange gasket 1206. First flange gasket 1202 and second flange gasket 1206 may be formed of a material such as polypropylene that can deform when inserted into an aperture of third tube connector 604 of second connector 206 to provide a seal against an interior surface of third tube connector 604. First flange gasket 1202 and second flange gasket 1206 flare outward in a direction sloped away from third tube connector 604 of second connector 206. First flange gasket 1202 and second flange gasket 1206 provide an interference fit to seal without leaks.

In the illustrative embodiment, first interval connector 210 was inserted into second connector 206. In an alternative embodiment, a portion of second connector 206 could be inserted into first interval connector 210 instead.

Figure 17:
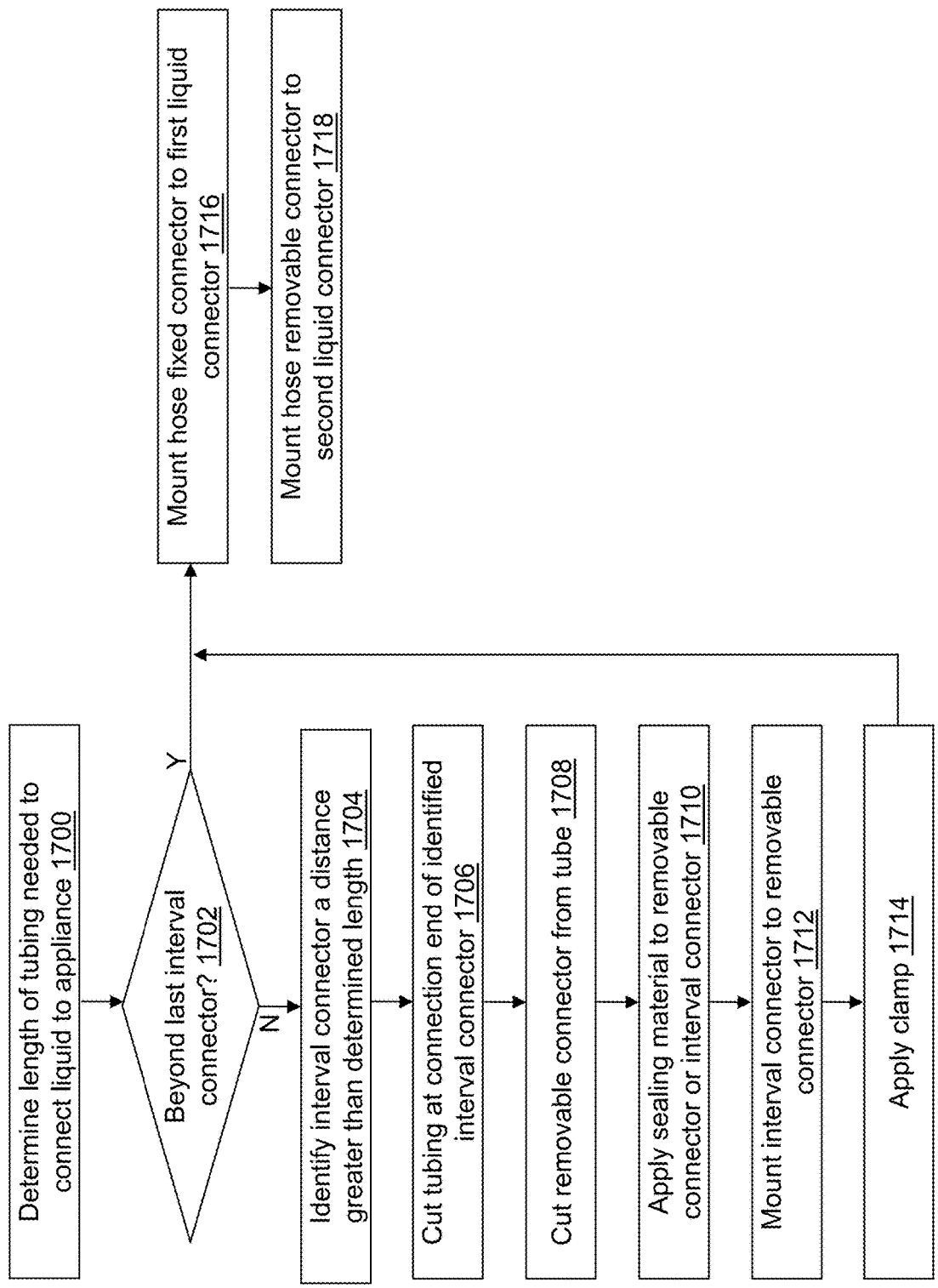
FIG. 17 depicts a flow diagram illustrating examples of operations to shorten the hose of FIG. 2 in accordance with an illustrative embodiment.

Referring to FIG. 17, example operations to shorten hose 200 are described in accordance with an illustrative embodiment. Additional, fewer, or different operations may be performed depending on the embodiment. The order of presentation of the operations of FIG. 17 is not intended to be limiting. Although some of the operational flows are presented in sequence, the various operations may be performed in various repetitions, concurrently, and/or in other orders than those that are illustrated.

In an operation 1700, a length of hose 200 to mount between a first liquid connector and a second liquid connector is determined. For example, a first distance between water faucet 104 and a first liquid connector of steam oven 100 is determined for first hose 102, and a second distance between a second liquid connector of steam oven 100 and drain tube 108 is determined for second hose 106. The length depends on how hose 200 is hung between the objects as understood by a person of skill in the art. For example, the connection can be direct or include some sag between the liquid connectors.

In an operation 1702, a determination is made concerning whether the length is greater than the distance to a last interval connector of the plurality of interval connectors 208 that is farthest from the fixed connector. When the length is greater than the distance to the last interval connector, processing continues in an operation 1716. When the length is less than the distance to the last interval connector, processing continues in an operation 1704 to shorten hose 200.

In operation 1704, an interval connector of the plurality of interval connectors 208 is identified that is a greater distance than the determined length from the fixed connector that is first connector 204 in the illustrative embodiment. In an alternative embodiment, an interval connector of the plurality of interval connectors 208 is identified that is a greater distance than the determined length from second connector 206.

In an operation 1706, tube 202 is cut, for example, along cut line 1306 that is at the connection end of the identified interval connector.

In an operation 1708, the removable connector is cut from tube 202, for example, along connector cut line 906 that is at the connection end of second tube body connector 600.

In an operation 1710, a sealing material may be applied to either the removable connector or the identified interval connector. For example, a plumber's tape or putty may be applied to reinforce the seal between the removable connector and the identified interval connector.

In an operation 1712, the identified interval connector is inserted into the connection end of the removable connector. For example, third band 1208 may be inserted into third tube connector 604.

In an operation 1714, a clamp may be applied around the connection end of the removable connector to reinforce the seal between the removable connector and the identified interval connector though a clamp is not necessary.

In operation 1716, the fixed connector is mounted to the first liquid connector. For example, first connector 204 may be mounted to water faucet 104.

In an operation 1718, the removable connector is mounted to the second liquid connector. For example, second connector 206 may be mounted to a liquid connector of the appliance such as steam oven 100.

Hose 200 can be shortened without additional parts while still providing a reliable seal with simple installation. Shortening hose 200 provides increased reliability as sags and potential debris accumulation are eliminated because the loop(s) of hose 200 are avoided.

As used herein, the term "mount" includes join, unite, connect, couple, associate, insert, hang, hold, affix, attach, fasten, bind, paste, secure, hinge, bolt, screw, rivet, solder, weld, adhesive, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element) unless specified otherwise. Elements referenced as mounted to each other herein may further be integrally formed together, for example, using a molding or thermoforming process as understood by a person of skill in the art. As a result, elements described herein as being mounted to each other need not be discrete structural elements unless specified otherwise. The elements may be mounted permanently, removably, or releasably unless specified otherwise.

Use of directional terms, such as top, bottom, right, left, front, back, upper, lower, horizontal, vertical, behind, etc. are merely intended to facilitate reference to the various surfaces of the described structures relative to the orientations introduced in the drawings and are not intended to be limiting in any manner unless otherwise indicated.

The word "illustrative" is used herein to mean serving as an example, instance, or illustration. Any aspect or design described herein as "illustrative" is not necessarily to be construed as illustrative or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A method of installing a hose comprising:
   determining a length of a hose to mount between a first liquid connector and a second liquid connector to transport a fluid;
   identifying an interval connector a greater distance than the determined length from a fixed connector mounted to a first end of a tube of the hose, wherein the interval connector is configured to mount to a removable connector, wherein the removable connector is mounted to a second end of the tube opposite the fixed connector, wherein the fixed connector is configured to mount to the first liquid connector, wherein the removable connector is configured to mount to the second liquid connector, wherein the hose comprises the tube, the fixed connector, the removable connector, and a plurality of interval connectors periodically spaced apart along a length of the tube between the fixed connector and the removable connector, and wherein the interval connector is identified from among the plurality of interval connectors;
   cutting the tube at a connection end of the identified interval connector;
   cutting the tube at a connection end of the removable connector; and
   mounting the connection end of the identified interval connector to the connection end of the removable connector to form a shortened hose.

2. The method of claim 1, wherein the tube is corrugated between pairs of interval connectors of the plurality of interval connectors, between the fixed connector and a closest interval connector of the plurality of interval connectors to the fixed connector, and between the removable connector and a closest interval connector of the plurality of interval connectors to the removable connector.

3. The method of claim 1, wherein the interval connector includes a plurality of flange gaskets that extend outward from the interval connector.

4. The method of claim 3, wherein the plurality of flange gaskets is formed of a rubber material configured to deform when inserted in the connection end of the removable connector to provide a seal.

5. The method of claim 3, wherein the plurality of flange gaskets extend outward in a direction sloped away from the connection end of the removable connector.

6. The method of claim 4, wherein mounting the connection end of the identified interval connector to the connection end of the removable connector comprises inserting the cut connection end of the identified interval connector into the connection end of the removable connector, wherein the plurality of flange gaskets deforms against an interior sidewall of the connection end of the removable connector.

7. The method of claim 1, wherein the tube is formed of a thermoplastic polymer material.

8. The method of claim 1, further comprising mounting the fixed connector to a liquid source or a drain, and mounting the removable connector to an appliance.

9. The method of claim 8, wherein a type of the appliance is selected from a group consisting of a refrigerator, a dishwasher, a steam oven, a water dispenser, a clothes washer, a steam dryer, and a coffee maker.

10. The method of claim 1, wherein the removable connector and the tube are formed of different materials.

11. The method of claim 1, further comprising applying a sealing material to an exterior surface of the connection end of the identified interval connector before mounting the connection end of the identified interval connector to the connection end of the removable connector.

12. The method of claim 1, further comprising mounting the fixed connector to an appliance, and mounting the removable connector to a liquid source or a drain.

13. The method of claim 1, wherein the tube comprises:
a first tube section, wherein the fixed connector is mounted to a first end of the first tube section; and
a second tube section, wherein the removable connector is mounted to a second end of the second tube section,
wherein the plurality of interval connectors are positioned between a second end of the first tube section and a first end of the second tube section, wherein the first end of the first tube section is opposite the second end of the first tube section, wherein the first end of the second tube section is opposite the second end of the second tube section.

14. The method of claim 13, wherein the first tube section, the interval connector, and the second tube section constitute a single, unsevered, and continuous piece of material that forms an unbroken section of the hose before cutting the tube.

15. The method of claim 14, wherein the single, unsevered, and continuous piece of material further includes the removable connector.

16. The method of claim 13, wherein the first tube section and the second tube section have a circular cross section through which the fluid is transported.

17. A method of installing a hose comprising:
determining a length of a hose to mount between a first liquid connector and a second liquid connector to transport a fluid;
identifying an interval connector a greater distance than the determined length from a fixed connector mounted to a first end of a tube of the hose, wherein the interval connector is configured to mount to a removable connector, wherein the removable connector is mounted to a second end of the tube opposite the fixed connector, wherein the fixed connector is configured to mount to the first liquid connector, wherein the removable connector is configured to mount to the second liquid connector, and wherein the removable connector and the tube are formed of different materials;
cutting the tube at a connection end of the identified interval connector;
cutting the tube at a connection end of the removable connector; and
mounting the connection end of the identified interval connector to the connection end of the removable connector to form a shortened hose.

18. The method of claim 17, wherein the tube is corrugated between pairs of interval connectors of the plurality of interval connectors, between the fixed connector and a closest interval connector of the plurality of interval connectors to the fixed connector, and between the removable connector and a closest interval connector of the plurality of interval connectors to the removable connector.

19. A method of installing a hose comprising:
determining a length of a hose to mount between a first liquid connector and a second liquid connector to transport a fluid;
identifying an interval connector a greater distance than the determined length from a fixed connector mounted to a first end of a tube of the hose, wherein the interval connector is configured to mount to a removable connector, wherein the removable connector is mounted to a second end of the tube opposite the fixed connector, wherein the fixed connector is configured to mount to the first liquid connector, wherein the removable connector is configured to mount to the second liquid connector, wherein the hose comprises the tube, the fixed connector, the removable connector, and a plurality of interval connectors periodically spaced apart along a length of the tube between the fixed connector and the removable connector, wherein the interval connector is identified from among the plurality of interval connectors, wherein the tube comprises a first tube section such that the fixed connector is mounted to a first end of the first tube section, a second tube section such that the removable connector is mounted to a second end of the second tube section, wherein the plurality of interval connectors are positioned between a second end of the first tube section and a first end of the second tube section, wherein the first end of the first tube section is opposite the second end of the first tube section, and wherein the first end of the second tube section is opposite the second end of the second tube section;
cutting the tube at a connection end of the identified interval connector;
cutting the tube at a connection end of the removable connector; and
mounting the connection end of the identified interval connector to the connection end of the removable connector to form a shortened hose.

20. The method of claim 19, wherein the first tube section, the interval connector, and the second tube section constitute a single, unsevered, and continuous piece of material that forms an unbroken section of the hose before cutting the tube, wherein the single, unsevered, and continuous piece of material further includes the removable connector, and wherein the first tube section and the second tube section have a circular cross section through which the fluid is transported.

\* \* \* \* \*